United States Patent
Filsfils et al.

(10) Patent No.: US 7,633,859 B2
(45) Date of Patent: *Dec. 15, 2009

(54) LOOP PREVENTION TECHNIQUE FOR MPLS USING TWO LABELS

(75) Inventors: Clarence Filsfils, Brussels (BE); Jim Guichard, Groton, MA (US); Jean-Philippe Vasseur, Dunstable, MA (US); Stefano B. Previdi, Rome (IT); Robert Raszuk, Komorow (PL)

(73) Assignee: Cisco Technology, Inc., San Jose, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 11/046,163

(22) Filed: Jan. 26, 2005

(65) Prior Publication Data

US 2006/0164975 A1    Jul. 27, 2006

(51) Int. Cl.
*H04L 12/56* (2006.01)

(52) U.S. Cl. .................. 370/225; 370/392; 370/401

(58) Field of Classification Search ......... 370/225–228, 370/237, 217, 221, 392, 401
See application file for complete search history.

(56) References Cited

U.S. PATENT DOCUMENTS

| | | | |
|---|---|---|---|
| 6,339,595 B1 | 1/2002 | Rekhter et al. | 370/392 |
| 6,665,273 B1 | 12/2003 | Goguen et al. | 370/252 |
| 6,778,492 B2 | 8/2004 | Charny et al. | 370/228 |
| 7,093,027 B1* | 8/2006 | Shabtay et al. | 709/239 |
| 7,127,523 B2* | 10/2006 | Kotser | 709/238 |
| 7,400,611 B2* | 7/2008 | Mukherjee et al. | 370/338 |
| 2002/0060985 A1 | 5/2002 | Lee et al. | 370/216 |
| 2002/0112072 A1 | 8/2002 | Jain | 709/239 |
| 2003/0028818 A1 | 2/2003 | Fujita | 714/4 |
| 2003/0152075 A1* | 8/2003 | Hawthorne et al. | 370/389 |
| 2003/0165139 A1* | 9/2003 | Chen et al. | 370/392 |

(Continued)

OTHER PUBLICATIONS

Andrew S. Tanenbaum, "Computer Networks", Fourth Edition, Section 1.4.2 pp. 41-44, Pearson Education 2003.

(Continued)

*Primary Examiner*—Jayanti K Patel
*Assistant Examiner*—Matthew Campbell
(74) *Attorney, Agent, or Firm*—Cesari and McKenna, LLP

(57) ABSTRACT

A fast reroute (FRR) technique is implemented at the edge of a network. In accordance with the technique, if an edge device detects a node or link failure that prevents it from communicating with a neighboring routing domain, the edge device reroutes at least some data packets addressed to that domain to a backup edge device which, in turn, forwards the packets to the neighboring domain. The rerouted packets are designated as being "protected" (i.e., rerouted) data packets before they are forwarded to the backup edge device. To differentiate which data packets are protected and which are not, the backup edge device employs different sets of VPN label values for protected and non-protected network traffic. That is, the backup edge device may allocate two different VPN label values for at least some destination address prefixes that are reachable through the neighboring domain: a first VPN label value for FRR protected traffic and a second VPN label value for non-protected traffic. Upon receiving a data packet containing a protected VPN label value, the backup edge device is not permitted to reroute the packet a second time, e.g., in response to another inter-domain node or link failure, thereby preventing loops from developing at the edge of the network.

23 Claims, 13 Drawing Sheets

U.S. PATENT DOCUMENTS

| | | | |
|---|---|---|---|
| 2003/0177263 A1* | 9/2003 | Robinson | 709/239 |
| 2003/0229690 A1* | 12/2003 | Kitani et al. | 709/223 |
| 2003/0233595 A1 | 12/2003 | Charny et al. | 714/4 |
| 2004/0052207 A1 | 3/2004 | Charny et al. | 370/216 |
| 2004/0109687 A1 | 6/2004 | Park et al. | 398/57 |
| 2004/0196827 A1 | 10/2004 | Xu et al. | 370/352 |
| 2005/0030921 A1* | 2/2005 | Yau | 370/329 |
| 2005/0232281 A1* | 10/2005 | Rosenzweig et al. | 370/400 |
| 2006/0126496 A1* | 6/2006 | Filsfils et al. | 370/216 |

OTHER PUBLICATIONS

Radia Perlman, "Interconnections Second Edition: Bridges, Routers, Switches, and Internetworking Protocols", Chapter 9 pp. 189-220, Addison Wesley Longman, Inc. 2000.

Radia Perlman, "Interconnections Second Edition: Bridges, Routers, Switches, and Internetworking Protocols", Sections 12.1-12.3 pp. 299-324, Addison Wesley longman, Inc. 2000.

Stephen A. Thomas, "IP Switching and Routing Essentials", Chapter 7 pp. 221-243, 2002.

Ivan Pepelnjak and Jim Guichard, "MPLS and VPN Architectures", Chapters 8-9 pp. 145-205, Cisco Press 2001.

F. Le Faucheur and W. Lai, "Requirements for Support Differentiated Services-aware MPLS Traffic Engineering", Request for Comments: 3564, Jul. 2003.

E. Rosen and Y.Rekhter, "BGP/MPLS VPNs", Request for Comments 2547, Mar. 1999.

Y. Rekhter and T. Li, "A Border Gateway Protocol 4 (BGP-4)", Request for Comments 1771, Mar. 1995.

Ed Ping Pan et al., "Fast Reroute Extensions to RSVP-TE for LSP Tunnels", Internet Draft draft-ietf-mpls-rsvp-lsp-fastreroute-07.txt, Expires Feb. 2005.

"MPLS Traffic Engineering Fast Reroute-Link Protection" available at http://www.cisco.com/univercd/cc/td/doc/product/software/ios120/120newft/120limit/120st/120st16/frr.htm#wp1015327.

T Bates et al. "Multiprotocol Extensions for BGP-4," Request for Comments 2858, Jun. 2000.

Y Rekhter "Carrying Label Information in BGP-4", Request for Comments 3107, May 2001.

Srihari R. Sangli et al. "BGP Extended Communities Attribute", Internet Draft draft-ietf-idr-bgp-ext-communities-07.txt available at http://ww.ietf.org, Sep. 2004.

Clarence Filsfils et al., "Fast Reroute (FRR) Protection At the Edge of a RFC 2547 Network" U.S. Appl. No. 11/010,225, filed Dec. 10, 2004.

* cited by examiner

| ADDRESS PREFIX 520 | VPN LABEL VALUE 530 | EGRESS IDENTIFIER 540 | FRR ENABLE FLAG 550 | FRR EXCLUDE FLAG 560 | BACKUP PE DEVICE 570 | BACKUP LABEL STACK (IGP LABEL, PROTECTED VPN LABEL) 580 |
|---|---|---|---|---|---|---|
| 10.1.2.0/24 | 57 | 1 | 1 | 0 | PE2 | 100, 75 |
| ... | ... | ... | ... | ... | ... | ... |

LABEL FORWARDING TABLE 500

FIG. 5

LOOP PREVENTION TECHNIQUE FOR MPLS USING TWO LABELS

FIELD OF THE INVENTION

This invention relates generally to routing data between private routing domains, and, more specifically, to a fast reroute (FRR) technique that quickly and efficiently reroutes network traffic to a neighboring exit point in the event of a node or link failure.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are required to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1 /24. In this case, the network portion of the prefix contains the 24 most-significant bits of the IP address 128.0.10.1, i.e., the network is 128.0.10.0, and the last 8 bits are used to identify hosts on that network. An IP address and an address prefix are said to "match" when the prefix's network portion equals the IP address's most-significant bits.

Interior Gateway Protocols

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks among the intermediate nodes in the routing domain. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. A variation of the BGP protocol, known as internal BGP (iBGP), is often used to distribute inter-network reachability information (address prefixes) among BGP-enabled edge devices in a routing domain. To implement iBGP, the edge devices must be "fully meshed," i.e., such that every device is coupled to every other device by way of a TCP connection. In practice, conventional route reflectors are used to logically couple devices into a full mesh. The BGP protocol also may be extended for compatibility with other services other than standard Internet connectivity. For instance, Multi-Protocol BGP (MP-BGP) supports various address family identifier (AFI) fields that permit BGP messages to transport multi-protocol information, such as is the case with RFC 2547 services.

A network node in a routing domain may detect a change in the domain's topology. For example, the node may become unable to communicate with one of its neighboring nodes, e.g., due to a link failure between the nodes or the neighboring node failing, such as going "off line" for repairs. If the detected node or link failure occurred within the routing domain, the detecting node may advertise the intra-domain topology change to other nodes in the domain using an interior gateway protocol, such as OSPF. Similarly, if an edge device detects a node or link failure that prevents communications with a neighboring routing domain, the edge device may disseminate the inter-domain topology change to its other fully-meshed edge devices, e.g., using the iBGP protocol. In either case, there is an inherent latency of propagating the network-topology change within the routing domain and having nodes in the domain converge on a consistent view of the new network topology, i.e., without the failed node or link.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional interior gateway protocols, such as OSPF. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node to forward the packet. The packet may contain a "stack" of labels such that the stack's top-most label determines the packet's next-hop destination. Typically, an IGP label determines the packet's next hop within a routing domain, and a VPN label determines the packet's next hop across routing domains. The packet's extracted label value is replaced with a new label value associated with the packet's next hop. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices. The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

FIG. 1 illustrates an exemplary MPLS/VPN network 100 containing a provider network 110 coupled to neighboring customer sites 120, 130 and 140. The provider network includes a plurality of PE devices 400, including devices PE1 400*a*, PE2 400*b* and PE3 400*c*. The PE devices are fully meshed at the BGP level. That is, each PE device in the provider network can communicate with every other PE device (either directly or by means of BGP route reflectors). The network 110 also contains "core" provider (P) devices 195*a*-*d*, such as routers, which are respectively labeled P1, P2, P3 and P4. These P devices may be used to establish label switched paths between pairs of PE devices. For example, the provider devices P1 and P2 may be used to establish a first LSP1 between PE3 and PE1, and the devices P3 and P4 may be used to establish a second LSP2 between PE3 and PE2.

Each neighboring customer site 120-140 contains one or more CE devices attached to PE devices in the provider network 110. For instance, the customer site 120 contains CE devices 160 and 165 (labeled CE1 and CE2) which are respectively coupled to PE1 and PE2. Similarly, the customer site 130 includes a CE device 135 (labeled CE4) attached to PE2 and the customer site 140 includes a CE device 185 (labeled CE3) attached to PE3. The customer sites 120-140 are assigned to respective VPNs. For purposes of illustration, the customer sites 120 and 140 are assigned to the VPN1 and the customer site 130 is assigned to the VPN2. In this arrangement, network nodes in the customer sites 120 and 140 (VPN1) may not establish communications with nodes in the customer site 130 (VPN2) and vice versa since they participate in different VPNs. However, network nodes in the customer site 120 may communicate with nodes in the customer site 140, and vice versa, since the customer sites 120 and 140 both participate in VPN1. Notably, VPN1 and VPN2 may contain overlapping IP address spaces.

As noted, communications may be established through the MPLS/VPN network 100 between remote customer sites participating in the same VPN, e.g., VPN1. The provider network 110 may create a MPLS tunnel, such as LSP1 or LSP2, to provide a logical data path between the remote customer sites of VPN1. Suppose a source node (S) 150 in the customer site 140 addresses a data packet 105 to a destination node (D) 155 in the customer site 120. The source node forwards the packet to its local customer edge device CE3, which in turn transfers the packet across domain boundaries to the provider edge device PE3. PE3 then determines an appropriate LSP over which to forward the packet through the provider network 110 to the customer site 120 containing the packet's addressed destination node 155.

The provider edge device PE3 may associate the received packet 105 with a LSP based on the packet's contained destination IP address. For purposes of discussion, assume the packet 105 is routed from PE3 to PE1 via LSP1, as shown in bold. The packet is received by the provider edge device PE1 at the tail-end of the LSP1 and the packet is then forwarded over the PE1-CE1 link to CE1 in the customer site 120. CE1 receives the packet and forwards it to the destination node 155.

Problems arise in the conventional MPLS/VPN architecture when a node or link failure prevents data communications over a PE-CE data link. For example, suppose that the PE1-CE1 link fails as denoted by a dotted "X." After identifying the failure, the provider edge device PE1 may advertise, within the provider network 110, that it has lost reachability to the IP addresses previously advertised by CE devices in the customer site 120. Accordingly, PE1 may propagate the identified routing change by disseminating iBGP update messages to its fully-meshed PE devices. Eventually, the routing change is distributed throughout the provider network 110 and each PE device updates its local routing information to converge on the new network topology, i.e., without the failed PE1-CE1 link.

The conventional latency required for the PE devices to converge on the new network topology, i.e., without the PE1-CE1 link, is often overly time consuming, e.g., on the order of seconds, and causes a number of significant problems. For instance, data packets are often "dropped" (i.e., discarded) at the edge of the provider network while the network is in the process of converging. For example, in response to the PE1-CE1 link failing, data packets 105 addressed to the destination node 155 will be dropped by PE1 (at the tail-end of LSP1) until the network converges on an alternate data path LSP2 for those packets. For many data flows, such as voice-over-IP (VoIP) and video data flows, this temporary loss of data at PE1 may significantly degrade the utility of the overall data transfer or may cause the data flow to time-out and stop completely.

It is therefore generally desirable for MPLS/VPN networks to achieve faster convergence times, e.g., sub-second convergence times, in response to CE node or link failures over PE-CE links. The MPLS/VPN networks should quickly converge on the new network topology with minimal data loss at the edge of the network.

SUMMARY OF THE INVENTION

The present invention overcomes the disadvantages of the prior art by providing a local fast reroute (FRR) technique that may be implemented at the edge of a computer network. In accordance with the technique, if an edge device detects a node or link failure that prevents it from communicating with a neighboring routing domain, the edge device reroutes at least some data packets addressed to that domain to a backup edge device which, in turn, forwards the packets to the neighboring domain. The rerouted packets are designated as being "protected" (i.e., rerouted) data packets before they are forwarded to the backup edge device. To differentiate which data packets are protected and which are not, the backup edge device employs different sets of VPN label values for protected and non-protected network traffic. That is, the backup edge device may allocate two different VPN label values for at least some destination address prefixes that are reachable through the neighboring domain: a first VPN label value for non-protected traffic and a second VPN label value for FRR-protected traffic. Upon receiving a data packet containing a protected VPN label value, the backup edge device is not permitted to reroute the packet a second time, e.g., in response to another inter-domain node or link failure, thereby preventing loops from developing at the edge of the network.

The allocation of VPN labels may be taken from a contiguous or non-contiguous block of label values, and these VPN label values may be allocated on a per-prefix or per-CE device basis. If an edge device is configured to allocate VPN label values on a per-prefix basis, then each address prefix that is reachable from the edge device, and requires FRR protection, is allocated a pair of non-protected and protected VPN label values from a contiguous label block, i.e., label values are allocated from the block in sequential order. When VPN labels are allocated on a per-CE device basis, the edge device associates each reachable CE device with a pair of non-protected and protected VPN label values that are selected from either a contiguous or non-contiguous block of label values.

In a first illustrative embodiment, the backup edge device allocates a pair of non-protected and protected VPN label values for every destination address prefix that is reachable to the backup edge device via the neighboring routing domain. These label values are taken from a contiguous label block where each address prefix is allocated a sequential set of non-protected and protected VPN label values, i.e., (L, L+1) as per the L+1 method of VPN label allocation. According to this illustrative embodiment, the backup edge device advertises to its adjacent edge devices ("peers") one or more reachable address prefixes and "flags" these advertised prefixes as being FRR protected in accordance with the L+1 method of VPN label allocation. Thereafter, the peers forward the backup edge device data packets containing either a non-protected or protected VPN label value, depending on whether the packets have been FRR rerouted.

In a second illustrative embodiment, the backup edge device allocates a pair of non-protected and protected VPN label values for every destination CE device that is reachable to the backup edge device via the neighboring routing domain. These VPN label values may be allocated from a contiguous block wherein each CE device is allocated a sequential set of non-protected and protected VPN label values, i.e., (L, L+1). Alternatively, a CE device may be allocated a sequential set of non-protected and protected VPN label values (L, L+1) where L is taken from a non-contiguous block of label values. According to this illustrative embodiment, the backup edge device advertises one or more address prefixes that are reachable via a given CE device. The advertised prefixes are associated with the non-protected VPN label value allocated to the CE device, and the prefixes are flagged as being FRR protected in accordance with the L+1 method of VPN label allocation. Thereafter, peer devices that receive the advertisement forward the backup edge device data packets containing either a protected or non-protected VPN label value, depending on whether the packets have been FRR rerouted.

In a third illustrative embodiment, the backup edge device allocates a non-protected VPN label value for each destination CE device that is reachable through the neighboring routing domain. According to this illustrative embodiment, the VPN label values are allocated from a non-contiguous block of label values and each CE device may be allocated a non-sequential set of non-protected and protected VPN label values, e.g., (L, L+x) where x is a predetermined offset from L. The backup edge device advertises one or more address prefixes that are reachable via a given CE device, and the advertisement specifies the CE device's non-protected VPN label value. The advertisement also flags the advertised prefixes as being FRR protected in accordance with the L+x method of VPN label allocation, where x is either expressly identified in the advertisement or known ahead of time to the peer devices that receive the advertisement. Thereafter, the peer devices forward the backup edge device data packets containing either a protected or non-protected VPN label value, depending on whether the packets have been FRR rerouted.

Advantageously, the inventive technique provides a fast and efficient way for a backup edge device to identify protected data packets that have been previously rerouted in response to, e.g., a CE node or PE-CE link failure. The technique is not limited to MPLS/VPN network architectures and may be deployed at the edge of networks implementing various topologies and protocols. Further, the invention is not limited to any particular hardware platform or set of software capabilities.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an illustrative label forwarding table configured to store FRR-related information;

DETAILED DESCRIPTION OF ILLUSTRATIVE EMBODIMENTS

In accordance with the illustrative embodiments, if an edge device detects a node or link failure that prevents it from communicating with devices in a neighboring domain, the edge device reroutes at least some data packets addressed to the neighboring domain to a backup edge device. The rerouted packets are preferably "tunneled" to the backup edge device, e.g., using an IP or MPLS tunneling mechanism. After receiving the rerouted packets, the backup edge device forwards the packets to the neighboring domain. Notably, the backup edge device is not permitted to reroute the received packets a second time, e.g., upon identifying another inter-domain node or link failure. As such, packet loops are avoided at the edge of the network.

Figure 1:
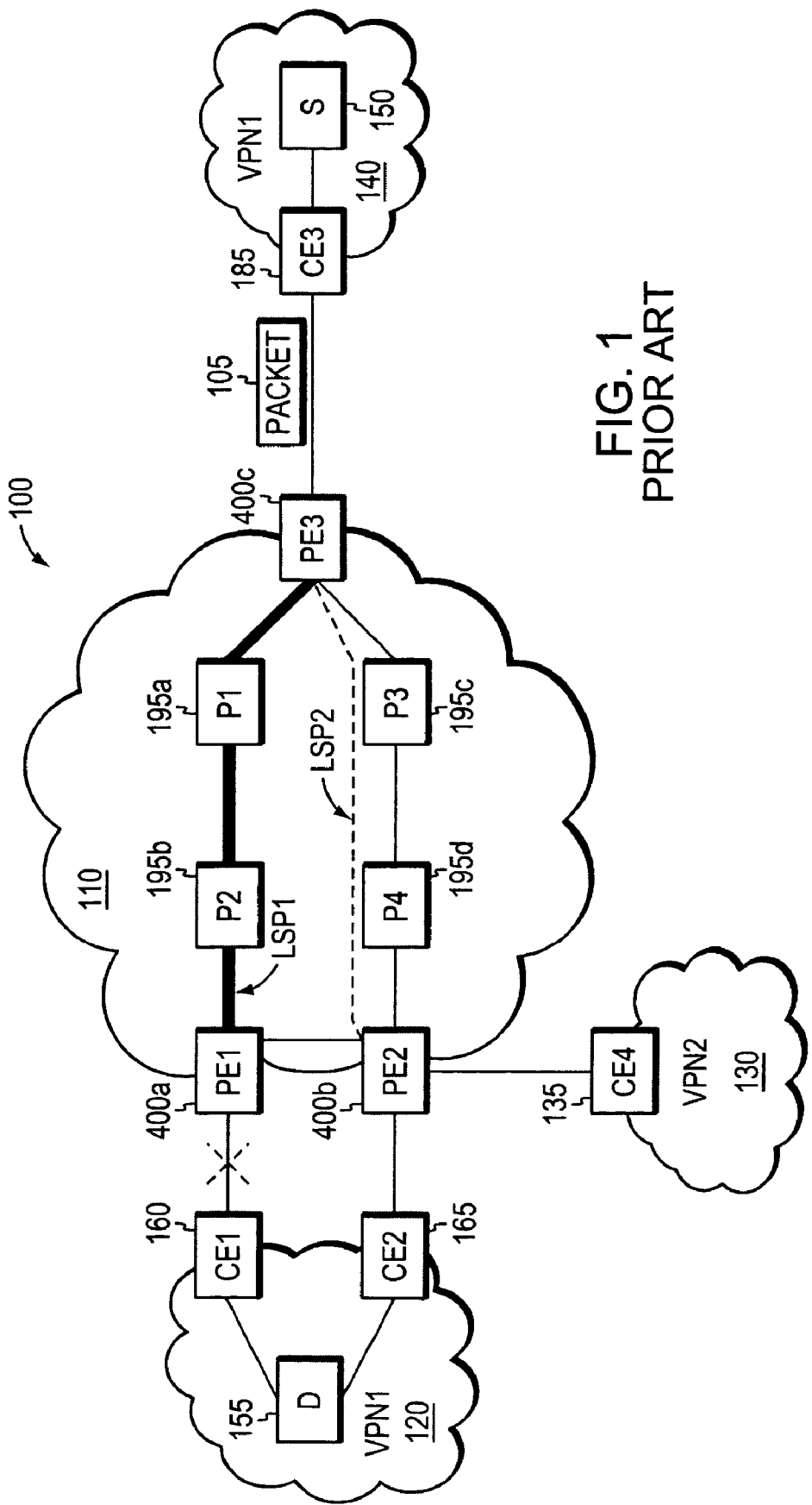
FIG. 1, previously described, is a schematic block diagram of a MPLS/VPN network topology.
Figure 2:
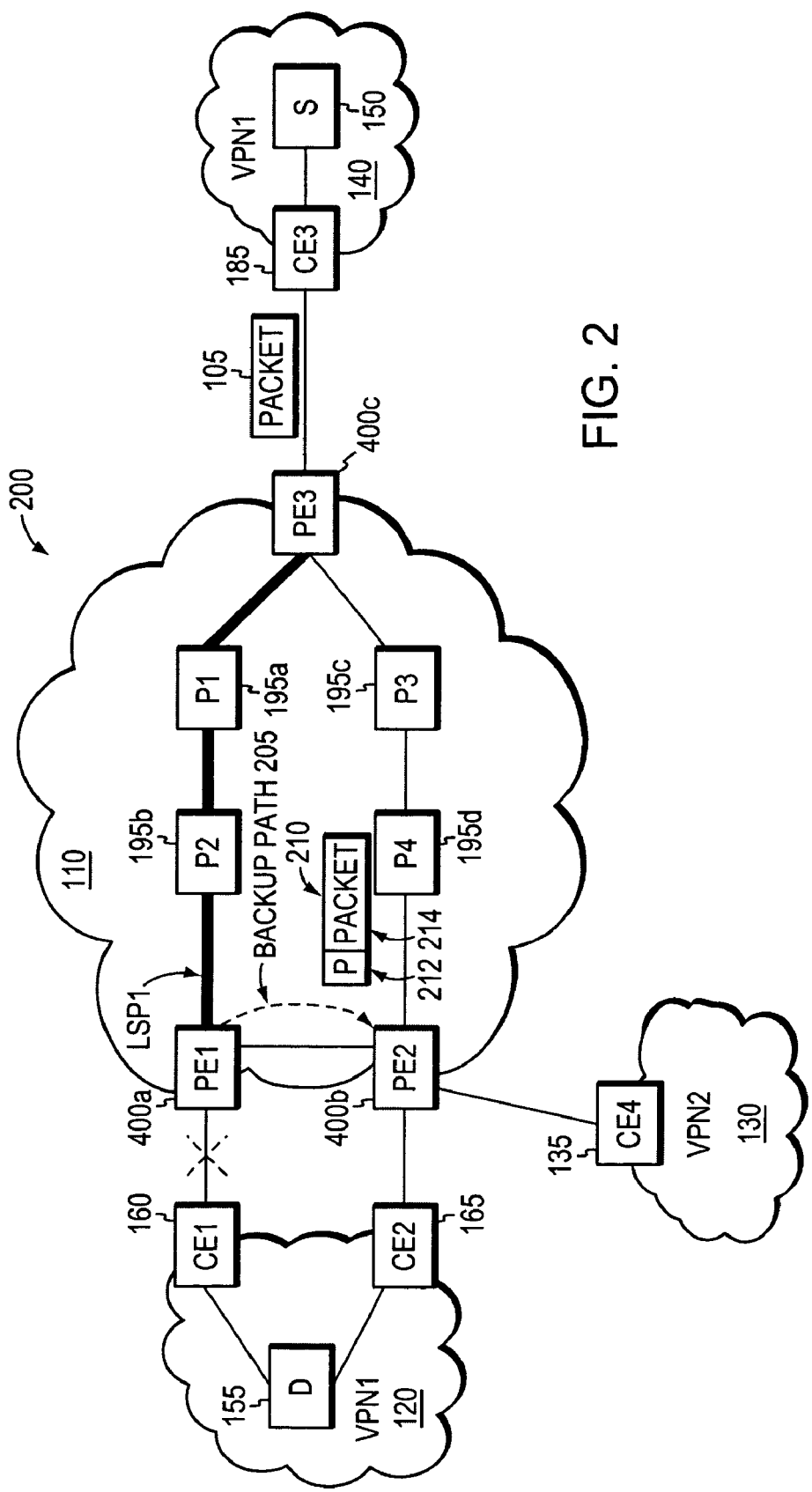
FIG. 2 is a schematic block diagram of an exemplary MPLS/VPN network topology in which the illustrative fast reroute (FRR) technique may be employed at the edge of the network. Those skilled in the art will appreciate that the network topology of FIG. 2 is merely representative and that the inventive FRR technique may be employed in other network topologies as well.

FIG. 2 illustrates a computer network 200 employing an illustrative embodiment of the invention. For ease of explanation, the network topology of network 200 is the same as that shown in FIG. 1. However, unlike in the network 100, the provider edge device PE1 does not "drop" packets upon losing communication with its neighboring customer site 120, e.g., due to a CE1 node failure or PE1-CE1 link failure. Instead, PE1 establishes a fast reroute (FRR) backup path 205 which is used to reroute at least some packets 210 to a backup provider edge device PE2 which is also coupled to the customer site 120. Packets 210 transported over the FRR backup path 205 may be encapsulated with at least one IP tunnel header or MPLS label stack associated with the backup path.

Prior to forwarding the rerouted packets to the backup edge device PE2, the edge device PE1 designates the rerouted packets as being "protected." For purposes of illustration, the rerouted packet 210 is shown as the concatenation of its protected status ("P") 212 and packet data ("packet") 214. Here, a packet's protected status 212 indicates that the packet is being rerouted in response to an inter-domain node or link failure. Illustratively, the protected status 212 is stored in a VPN label in the data packet 210. That is, the backup edge device PE2 may allocate two different VPN label values for at least some destination address prefixes or CE devices that are reachable through the customer site 120: a first VPN label value for non-protected traffic and a second VPN label value for FRR-protected traffic. The provider edge device PE2, after receiving the protected packet 210, is not permitted to reroute the packet 210 a second time in the event that it too loses communication with the customer site 120, e.g., due to a CE2 node failure or a PE2-CE2 link failure. Thus, the rerouted packet 210 cannot be circulated within loops created at the edge of the provider network 110.

Figure 3:
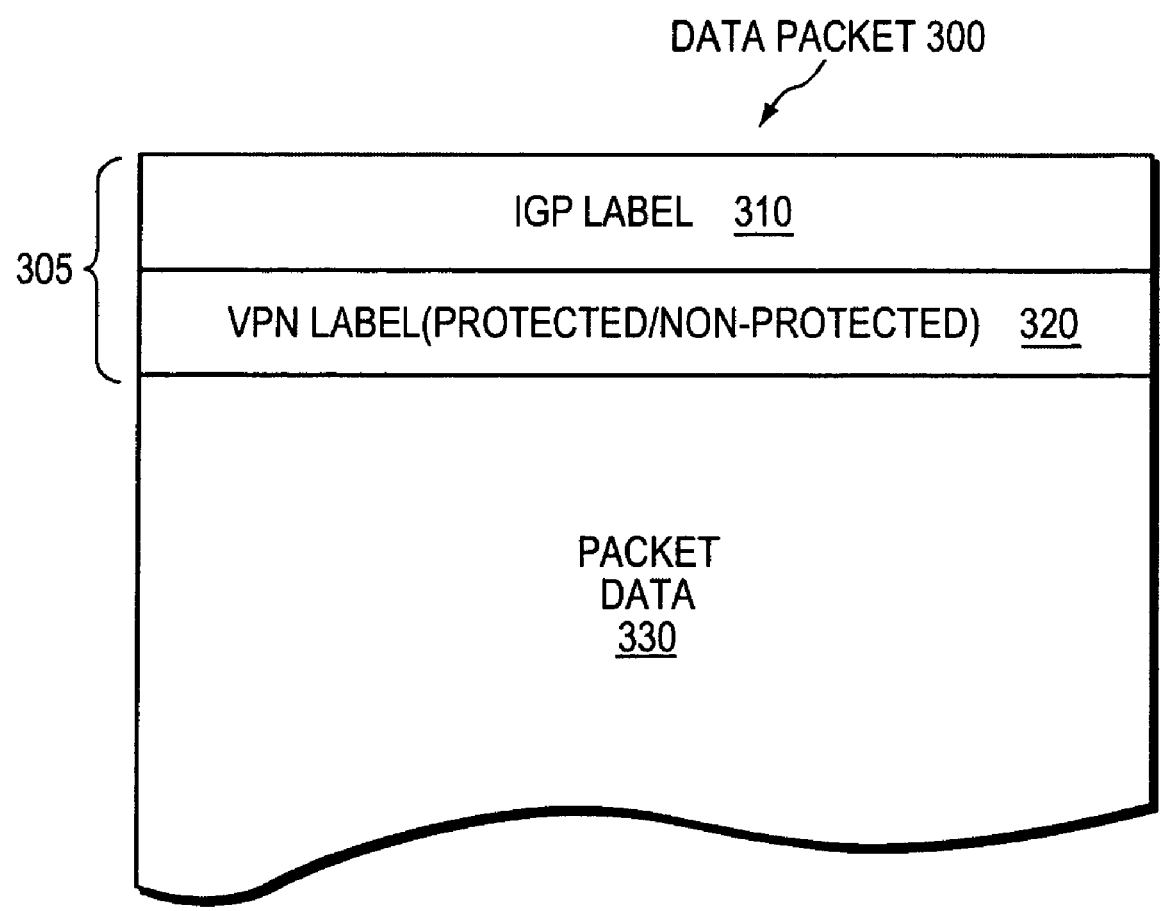
FIG. 3 is a schematic block diagram of an illustrative data packet including a Multi-Protocol Label Switching (MPLS) label stack.

FIG. 3 illustrates an exemplary data packet 300 that may be communicated within the provider network 110. The packet 300 includes a MPLS label stack 305 and packet data 330. The top-most label in the label stack is an interior gateway protocol (IGP) label 310 that identifies the packet's next "hop" between label switched routers in the provider network. The label stack also contains a virtual private network (VPN) label 320 that identifies a particular customer-site VPN route for the packet at a given PE device. P and PE devices in the provider network typically distribute their IGP label values using, e.g., the LDP or RSVP protocols; fully-meshed PE devices may distribute their protected and non-protected VPN label values using, e.g., the MP-BGP protocol.

In accordance with the illustrative embodiments, the value of the VPN label 320 indicates whether the data packet 300 is a protected or a non-protected packet. That is, a "protected" VPN label value indicates that the data packet 300 was previously rerouted at the edge of the provider network 110. Likewise, a "non-protected" VPN label value indicates that the packet was not previously rerouted. Thus, upon determining that a received data packet 300 contains a protected VPN label value 320, a PE device may not reroute the protected packet a second time, e.g., in response to a CE device or PE-CE link failure.

Figure 4:
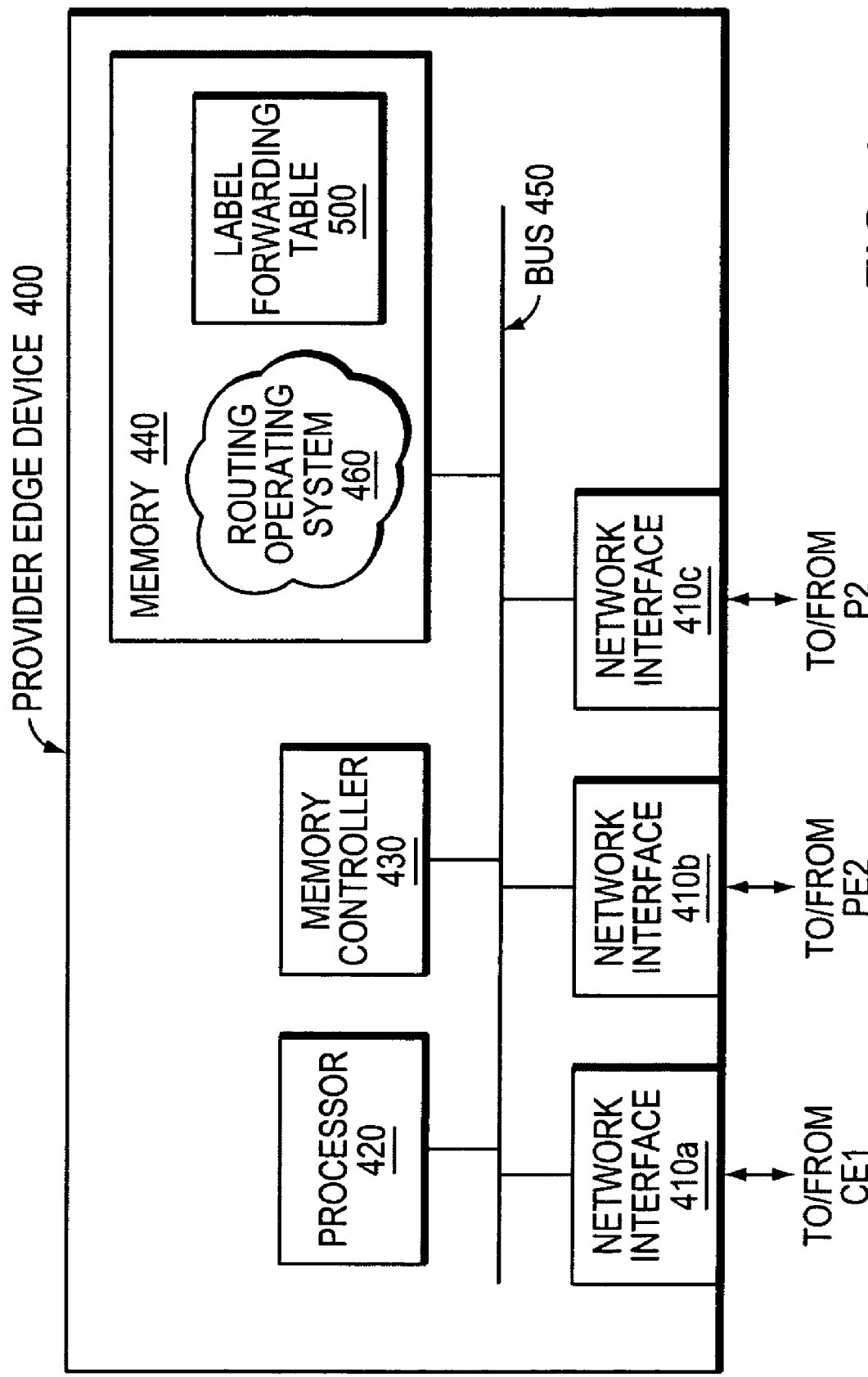
FIG. 4 is a schematic block diagram of a provider edge (PE) device which may implement FRR operations at the edge of a MPLS/VPN network.

FIG. 4 is a schematic block diagram of an exemplary provider edge device 400, such as a router, that may be advantageously used with the present invention. Suitable intermediate nodes that may be used with the present invention include, but are not limited to, the Cisco 7200 and 7600 Series Routers and Catalyst 6500 Series Switches available from Cisco Systems Incorporated, San Jose, Calif. For ease of illustration and description, the PE device 400 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 400 is merely exemplary and that the advantages of the present invention may be realized on a variety of different hardware platforms having various software capabilities.

The PE device 400 comprises one or more network interfaces 410, a processor 420, a memory controller 430 and a memory 440 interconnected by a system bus 450. Each network interface 410 may be a physical or logical interface that connects the PE device 400 with a neighboring node. For example, as shown, the network interface 410a is coupled to the customer edge device CE1 located in the customer site 120. The network interfaces 410b and 410c are respectively coupled to the devices PE2 and P2 in the provider network 110. Each network interface 410 may be adapted to transfer and acquire data packets to and from various transport media such as, e.g., Fast Ethernet (FE), Gigabit Ethernet (GE), wireless links, optical links, etc. Functionally, the interfaces 410 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 440 comprises a plurality of storage locations that are addressable by the processor 420 and the network interfaces 410 via the memory controller 430. The memory 440 preferably comprises a form of random access memory (RAM) that is generally cleared by a power cycle or other reboot operation (e.g., it is a "volatile" memory). For instance, the memory 440 may comprise dynamic RAM (DRAM) and/or synchronous DRAM (SDRAM) storage locations adapted to store program code and data structures accessible to the processor 420. It will be apparent to those skilled in the art that the memory 440 also may comprise other memory means, including various computer-readable media, for storing program instructions and data structures pertaining to the operation of the PE device 400.

The memory 440 stores, among other things, computer-readable instructions for implementing a routing operating system 460 that functionally organizes the PE device 400 by, e.g., invoking network operations in support of software processes and services executing on the processor 420. The IOS™ operating system by Cisco Systems Incorporated is one example of an operating system 460 that may be stored in the memory 440 and executed in accordance with the illustrative embodiments herein. The IOS operating system includes various routing services, such as conventional interior and exterior gateway protocols. The present invention also may be deployed with other operating systems, such as the IOS-XR™ operating system by Cisco Systems Incorporated, in which one or more of these routing services is executed as a separate process, i.e., having its own process address space apart from the operating system's.

The memory 440 stores a label forwarding table 500 (or "label forwarding information base (LFIB)") configured to store VPN label information used to forward data packets from the PE device 400 to neighboring customer sites. The label forwarding table 500 is also configured to store FRR-related information as described in more detail below. The memory 440 may include a separate label forwarding table (not shown) for storing IGP label information used to forward data packets within the provider network 110. When the PE device 400 receives a data packet 300 from a P or PE device in the provider network 110, the operating system 460 may locate a VPN label value 320 in the received packet's MPLS label stack 305. The operating system then may perform a label lookup operation in the label forwarding table 500 based on the packet's VPN label value. The result of the lookup operation can be used to determine a particular PE-CE link over which the received packet should be forwarded next.

FIG. 5 illustrates an exemplary label forwarding table 500 that may be used in accordance with an illustrative embodiment of the invention. The table 500 includes a plurality of table entries 510, each of which is configured to store, among other things, an address prefix value 520, a VPN label value 530, an egress identifier value 540, a "FRR enable" flag value 550, a "FRR exclude" flag value 560, a backup PE device identifier 570 and a backup MPLS label stack 580. The address prefix value 520 stores an IP address prefix that is reachable to the PE device 400 from a directly-attached CE device. The VPN label value 530 indicates to which VPN the address prefix value 520 belongs. Notably, the VPN label value 530 may be a non-protected or protected VPN label value. The egress identifier value 540 is used to identify which network interface 310 should be used to forward data packets whose VPN label values 320 equal the VPN label value 530 and whose destination IP addresses match the address prefix value 520.

The FRR enable flag 550 stores a value indicating whether FRR operations are currently being performed for data packets having VPN label values and destination IP addresses that match the contents of the table entry 510. When the operating system 460 detects a node or link failure over a PE-CE data link, the operating system sets the FRR enable flag values for those IP address prefixes 520 that were reachable over the failed PE-CE link. As used herein, the FRR enable flag 550 is "set" when it equals a first predetermined value (e.g. "1"). Otherwise, the FRR enable flag equals a second predetermined value (e.g., "0").

The FRR exclude flag 560 stores a value indicating whether FRR operations should not be performed even when the FRR enable flag 550 is set. The FRR exclude flag may equal a first predetermined value (e.g. "1") to indicate that FRR operations are not permitted to be performed and may equal a second predetermined value (e.g., "0") otherwise. The value of the FRR exclude flags 560 may be manually selected, e.g., by a system administrator. However, in a preferred embodiment, the FRR exclude flag values are dynamically determined by the routing operating system 460. For instance, the operating system may specify that only address prefixes advertised by selected customer sites or by customer sites participating in certain VPNs may be FRR protected. Furthermore, since protected data packets are not permitted to be FRR protected a second time, some embodiments may set the flag values 560 to exclude from FRR protection any address prefix values 520 associated with "protected" VPN label values 530.

A set of one or more backup PE devices 570 may be associated with each address prefix value 520. Each backup PE device may be associated with a backup label stack 580, e.g., including an IGP label value and a protected VPN label value, that should be included in FRR rerouted packets 210 matching the table entry 510. The IGP label value may be determined based on the contents of a separate label forwarding table (not shown) configured to store IGP label information used to forward data packets within the provider network 110. The backup PE devices 570 and their backup label stacks 580 may be statically configured, e.g., by a system administrator, or dynamically "learned" (acquired) by the operating system 460.

As shown, the exemplary label forwarding table 500 contains a table entry 510 for received data packets storing a VPN label value equal to 57 and a destination IP address matching the address prefix value 10.1.2.0/24. In this example, the flag values 550 and 560 indicate that FRR operations are currently underway and have not been excluded for non-protected data packets containing VPN label values equal to 57. The egress identifier value 540 indicates over which network interface 310 the received data packets should be forwarded. The table entry 510 also indicates that non-protected data packets should be FRR rerouted to the backup PE device PE2, and that the rerouted packets should include a MPLS label stack having an IGP label value equal to 100 and a protected VPN label value equal to 75.

In a first illustrative embodiment, a PE device allocates a pair of non-protected and protected VPN label values for every destination address prefix that is reachable to the PE device via a neighboring routing domain. These VPN label values are allocated from a contiguous label block where label values are allocated in sequential order, i.e., there are no unallocated label values numerically situated between any given pair of allocated label values. Accordingly, each address prefix is allocated a sequential set of non-protected and protected VPN label values, i.e., (L, L+1) as per the L+1 method of VPN label allocation. The PE device advertises to its adjacent PE devices ("peers") one or more reachable address prefixes and "flags" these advertised prefixes as being FRR protected in accordance with the L+1 method of VPN label allocation. Thereafter, the peers forward to the PE device data packets containing either a non-protected or protected VPN label value, depending on whether the packets have been FRR rerouted.

Figure 6:
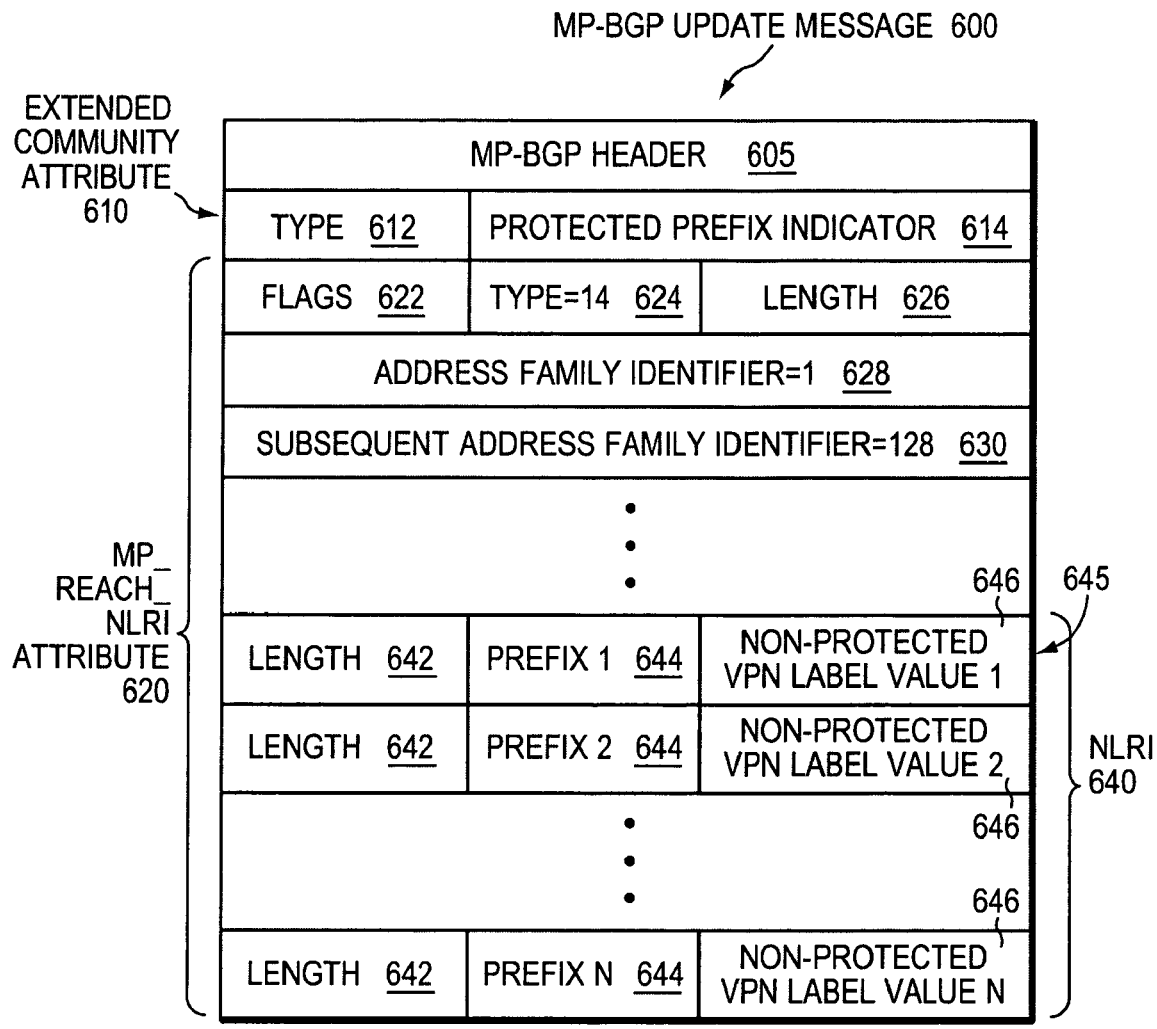
FIG. 6 is a schematic block diagram of an exemplary Multi-Protocol Border Gateway Protocol (MP-BGP) Update message that may be used to disseminate protected and non-protected VPN label values in accordance with a first illustrative embodiment.

FIG. 6 illustrates a MP-BGP Update message 600 that a PE device may use to advertise a set of address prefixes and their corresponding non-protected VPN label values. In accordance with the first illustrative embodiment, the MP-BGP Update message includes a flagging mechanism to indicate that the advertised prefixes are FRR protected using the L+1 method of VPN label allocation. The message 600 includes, among other things, a MP-BGP header 605, a BGP extended community attribute 610 and a MP_Reach_NLRI attribute 620. The MP-BGP header 605 stores conventional BGP header information, such as a BGP marker, a total message length, a type code identifying the message 600 as a BGP Update, etc. Other BGP header information that may be stored in the header 605 is described in more detail in the RFC 1771, entitled *A Border Gateway Protocol 4* (BGP-4), which is hereby incorporated by reference in its entirety.

The MP_Reach_NLRI attribute 620 stores, inter alia, a flags field 622, a type field 624, a length field 626, an address family identifier (AFI) field 628, a subsequent address family identifier (SAFI) field 630 and a set of network layer reachability information 640 (NLRI). The flags field 622 may be configured to store one or more flag bits that characterize properties of the attribute 620. For instance, separate flag bits may be used to indicate whether the attribute is transitive, optional, contains only partial information, and so forth. The type field 624 stores a value equal to 14 which indicates that the attribute 620 is an MP_Reach_NLRI attribute. The length field 626 stores the length (e.g., in octets) of the attribute 620.

The AFI field 628 stores a value equal to 1 to indicate that the MP_Reach_NLRI attribute contains IP version 4 (IPv4) address information. The SAFI field 630 stores a value equal to 128 to further specify that the attribute 620 also includes VPN label information for RFC 2547 MPLS/VPN networks. Those skilled in the art will appreciate that the MP_Reach_NLRI attribute 620 may contain other fields and/or values in addition to, or in place of, those illustrated in the exemplary BGP Update message 600. The format of the MP_Reach_NLRI attribute is described in more detail in RFC 2858, entitled *Multiprotocol Extensions for BGP-4*, by T. Bates et al., published June 2000, which is hereby incorporated by reference as though fully set forth herein.

The set of NLRI 640 stores non-protected VPN label values for an arbitrary number (N) of address prefixes advertised in the MP-BGP Update message 600. Specifically, each advertised address prefix is associated with a corresponding NLRI entry 645 containing a length field 642, an address prefix field 644 and a non-protected VPN label value field 646. The length field 642 stores the length (e.g., in bits) of the address prefix stored in the address prefix field 644. The address prefix stored in the field 644 is associated with a non-protected VPN label value stored in the field 646. Here, it is noted that each NLRI entry 645 is preferably encoded as set forth in RFC 3107, entitled *Carrying Label Information in BGP-4*, by Y. Rekhter et al., dated May 2001, which is hereby incorporated by reference in its entirety. However, it is expressly contemplated that the NLRI entries 645 may be formatted in other formats that equivalently pair the address prefixes with their associated non-protected VPN label values.

The BGP extended community attribute 610 is used to flag the set of address prefixes 644 as being FRR protected using the L+1 method of VPN label allocation. To that end, the attribute 610 includes, inter alia, a type field 612 and a protected prefix indicator field 614. The type field 612 stores a value indicating that the attribute 610 is being used to flag a set of prefixes as being FRR protected. The protected prefix indicator field 614 stores a value indicating that the advertised prefixes 644 are protected using the L+1 method of VPN label allocation. That is, each advertised address prefix 644 is allocated a protected VPN label value that is one greater than its corresponding non-protected VPN label value 646. Various types of extended community attributes 610 may be employed in this illustrative embodiment, including but not limited to extended community attributes described in the IETF Internet Draft draft-ietf-idr-bgp-ext-communities-07.txt, entitled *BGP Extended Communities Attribute*, by S. Sangli et al., which is hereby incorporated by reference as though fully set forth herein.

Figure 7:
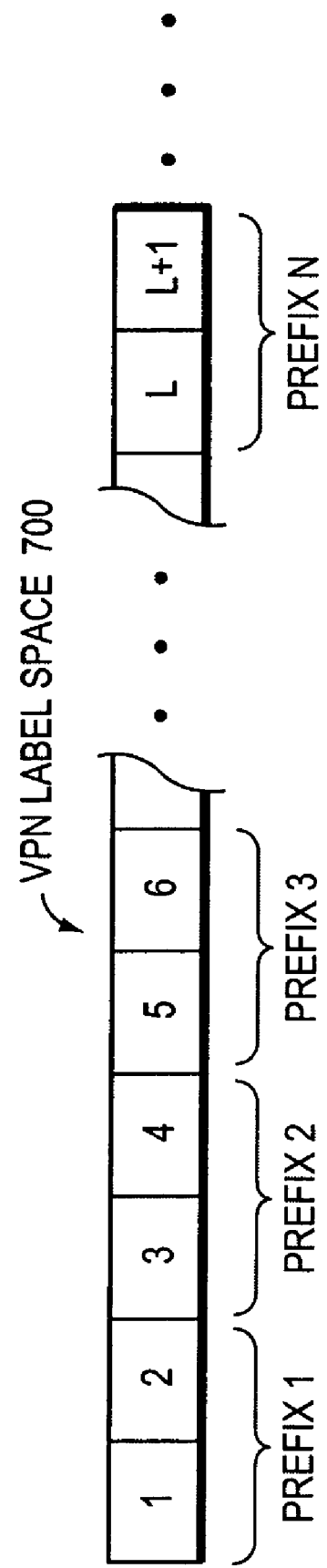
FIG. 7 is a schematic block diagram of an exemplary VPN label space in which each address prefix is associated with a contiguous set of protected and non-protected VPN label values.

FIG. 7 illustrates an exemplary contiguous VPN label space 700 in which every address prefix is allocated a sequential set of non-protected and protected VPN label values, e.g., (L, L+1). By allocating consecutive non-protected and protected VPN label values in this manner, the VPN label space is utilized more efficiently and the number of unused VPN label values may be reduced. For instance, in the exemplary VPN label space 700, the Prefix 1 is allocated the sequential VPN label values 1 and 2; similarly, the Prefix 2 is allocated the protected and non-protected VPN label values 3 and 4, and so forth until consecutive pairs of VPN label values have been allocated in the label space 700 for each of the N address prefixes advertised in the BGP Update message 600. In practice, only the least significant bit of, e.g., a 20-bit VPN label value is required to differentiate between a non-protected and protected VPN label value. Accordingly, a PE device that receives a data packet 300 can quickly check the least significant bit of the packet's VPN label 320 to determine whether or not the packet has been FRR rerouted.

In a second illustrative embodiment, a PE device allocates a pair of non-protected and protected VPN label values for every CE device that is reachable to the PE device. These VPN label values may be allocated from a contiguous block wherein each CE device is allocated a sequential set of non-protected and protected VPN label values, i.e., (L, L+1). Alternatively, a CE device may be allocated a sequential set of non-protected and protected VPN label values (L, L+1) where L is taken from a non-contiguous block of label values. According to this illustrative embodiment, the PE device advertises a set of one or more address prefixes that are reachable from a neighboring CE device. The advertised prefixes are associated with the non-protected VPN label value allocated to the CE device, and the prefixes are flagged as being FRR protected using the L+1 method of VPN label allocation. Thereafter, peer devices that receive the advertisement forward the PE device data packets containing either a protected or non-protected VPN label value, depending on whether the packets have been FRR rerouted.

Figure 8:
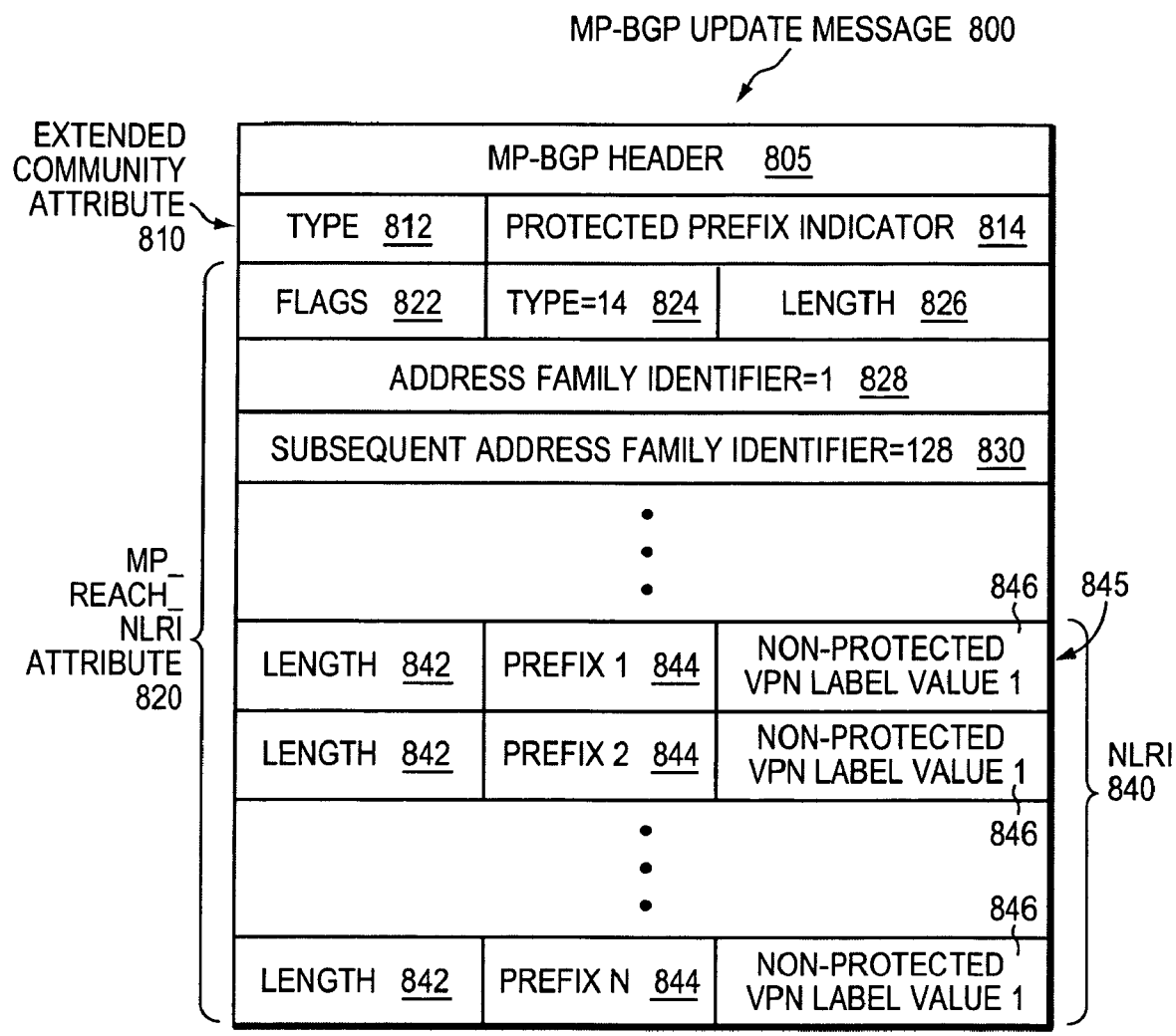
FIG. 8 is a schematic block diagram of an exemplary MP-BGP Update message that may be used to disseminate protected and non-protected VPN label values in accordance with a second illustrative embodiment.

FIG. 8 illustrates a MP-BGP Update message 800 that a PE device may use to advertise a set of address prefixes that are reachable to the PE device via a neighboring CE device. Each advertised prefix value is associated with the non-protected VPN label value that the PE device allocates for the CE device. The MP-BGP Update message includes a flagging mechanism to indicate that the advertised prefixes are FRR protected using the L+1 method of VPN label allocation. The message 800 includes, among other things, a MP-BGP header 805, a BGP extended community attribute 810 and a MP_Reach_NLRI attribute 820. The MP-BGP header 805 stores conventional BGP header information, such as a BGP marker, a total message length, a type code identifying the message 800 as a BGP Update, etc. Other BGP header information that may be stored in the header 805 is described in more detail in the RFC 1771, entitled *A Border Gateway Protocol 4* (BGP-4), which is hereby incorporated by reference in its entirety.

The MP_Reach_NLRI attribute 820 stores, inter alia, a flags field 822, a type field 824, a length field 826, an AFI field 828, a SAFI field 830 and a set of NLRI 840 containing one or more NLRI entries 845. The contents of the fields 822-846 are substantially the same as the contents of the fields 622-646 described above with regards to the MP-BGP Update message 600. However, unlike the message 600, each address prefix 844 advertised in the NLRI 840 is associated with the same non-protected VPN label value, i.e., the non-protected VPN label value allocated for the CE device through which the advertised prefixes are reachable.

The BGP extended community attribute 810 is used to flag the set of address prefixes 844 as being FRR protected using the L+1 method of VPN label allocation. To that end, the attribute 810 includes, inter alia, a type field 812 and a protected prefix indicator field 814. The type field 812 stores a value indicating that the attribute 810 is being used to flag a set of prefixes as being FRR protected. The protected prefix indicator field 814 stores a value indicating that the advertised prefixes 844 are protected using the L+1 method of VPN label allocation. That is, a protected VPN label value corresponding to the advertised address prefixes 844 may be derived by adding one to their associated non-protected VPN label value 846. Notably, because each prefix 844 in this embodiment is associated with the same non-protected VPN label value 846, each of the prefixes is also associated with the same protected VPN label value, i.e., that is one greater than the non-protected label value. Various types of extended community attributes 810 may be employed in this illustrative embodiment, including but not limited to BGP attributes described in the IETF Internet Draft draft-ietf-idr-bgp-ext-communities-07.txt, entitled *BGP Extended Communities Attribute*, by S. Sangli et al., which is hereby incorporated by reference as though fully set forth herein.

Figure 9A:
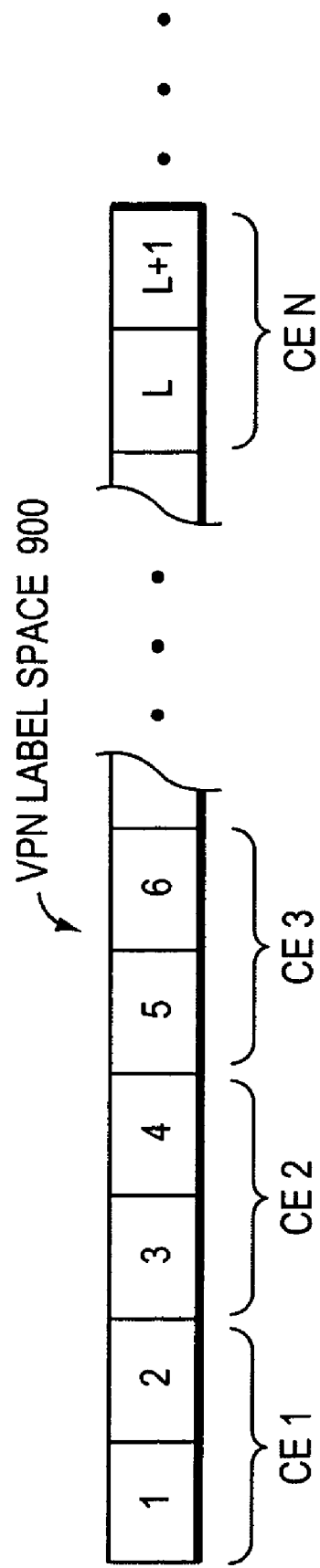
FIG. 9A is a schematic block diagram of an exemplary VPN label space in which each customer edge (CE) device is associated with a sequential set of protected and non-protected VPN label values selected from a contiguous block of label values.

FIG. 9A illustrates an exemplary contiguous VPN label space 900 in which every CE device is allocated a sequential set of non-protected and protected VPN label values, e.g., (L, L+1). By allocating consecutive non-protected and protected VPN label values in this manner, the VPN label space is utilized more efficiently and the number of unused VPN label values may be reduced. For instance, in the exemplary VPN label space 900, the CE device labeled "CE1" is allocated the sequential VPN label values 1 and 2; similarly, CE2 is allocated the protected and non-protected VPN label values 3 and 4, and so forth until consecutive pairs of VPN label values have been allocated in the label space 900 for each of the N different CE devices that are reachable to the PE device that allocates VPN label values from the space 900.

Figure 9B:
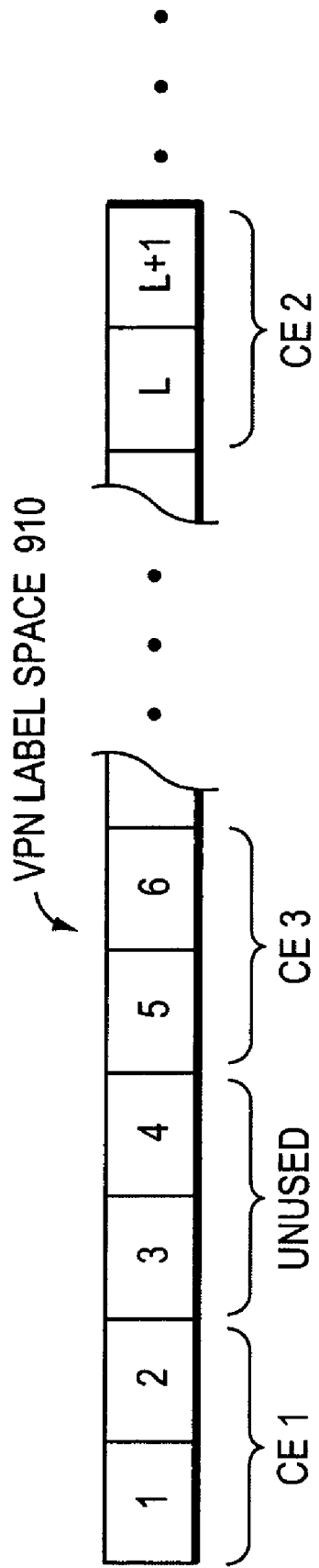
FIG. 9B is a schematic block diagram of an exemplary VPN label space in which each CE device is associated with a sequential set of protected and non-protected VPN label values selected from a non-contiguous block of label values.

FIG. 9B illustrates an exemplary non-contiguous VPN label space 910 in which sequential sets of VPN label values are allocated. Here, each CE device is allocated a set of non-protected and protected VPN label values (L, L+1), wherein one or more unallocated VPN label values may be situated between different sets of allocated VPN label values. For instance, as shown, the CE device labeled CE1 is allocated a pair of VPN label values equal to 1 and 2, and the device CE3 is allocated the VPN label values 5 and 6. Accordingly, the VPN label values 3 and 4 are unused, and therefore remain available to be allocated for another CE device.

In a third illustrative embodiment, a PE device allocates a non-protected VPN label value for each of its neighboring CE devices. However, unlike the second illustrative embodiment above, the VPN label values are allocated from a non-contiguous block of label values and each CE device may be allocated a non-sequential set of non-protected and protected VPN label values, e.g., (L, L+x) where x is a predetermined offset from L. The PE device advertises one or more address prefixes that are reachable via a given CE device, and the advertisement specifies the CE device's non-protected VPN label value. The advertisement also flags the advertised prefixes as being FRR protected in accordance with the L+x method of VPN label allocation, where x is either expressly identified in the advertisement or known ahead of time to the peer devices that receive the advertisement.

Figure 9C:
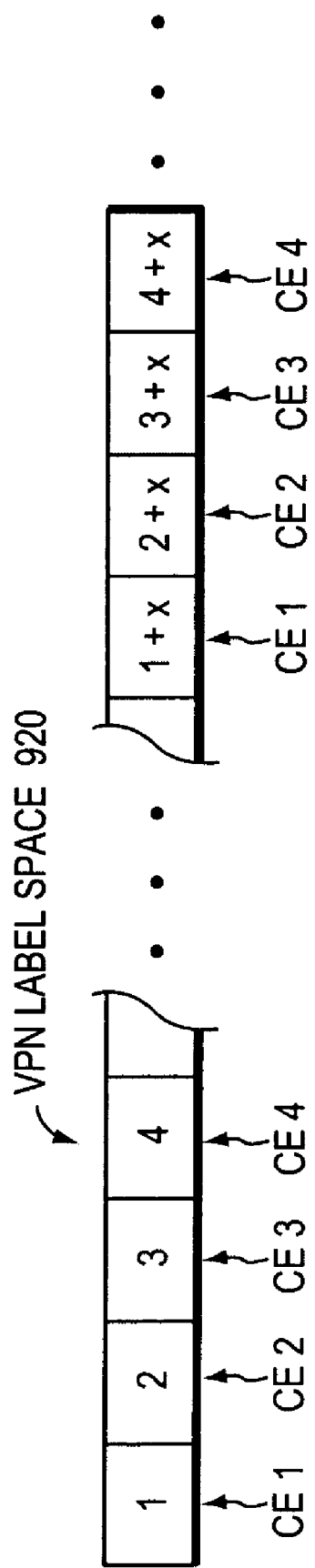
FIG. 9C is a schematic block diagram of an exemplary VPN label space in which each CE device is associated with a non-contiguous set of protected and non-protected VPN label values selected from a non-contiguous block of label values.

FIG. 9C illustrates an exemplary non-contiguous VPN label space 920 in which non-sequential sets of non-protected and protected VPN label values are allocated to CE devices. In this example, each CE device is allocated a set of non-protected and protected VPN label values (L, L+x), where x is a predetermined offset value that is greater than or equal to one. For instance, as shown, the CE device labeled CE1 is allocated a pair of VPN label values equal to 1 and 1+x, CE2 is allocated the VPN label values 2 and 2+x, and so forth. The PE device that allocates VPN label values from the space 920 is configured to ensure that different pairs of non-protected and protected VPN label values do not overlap.

Figure 10:
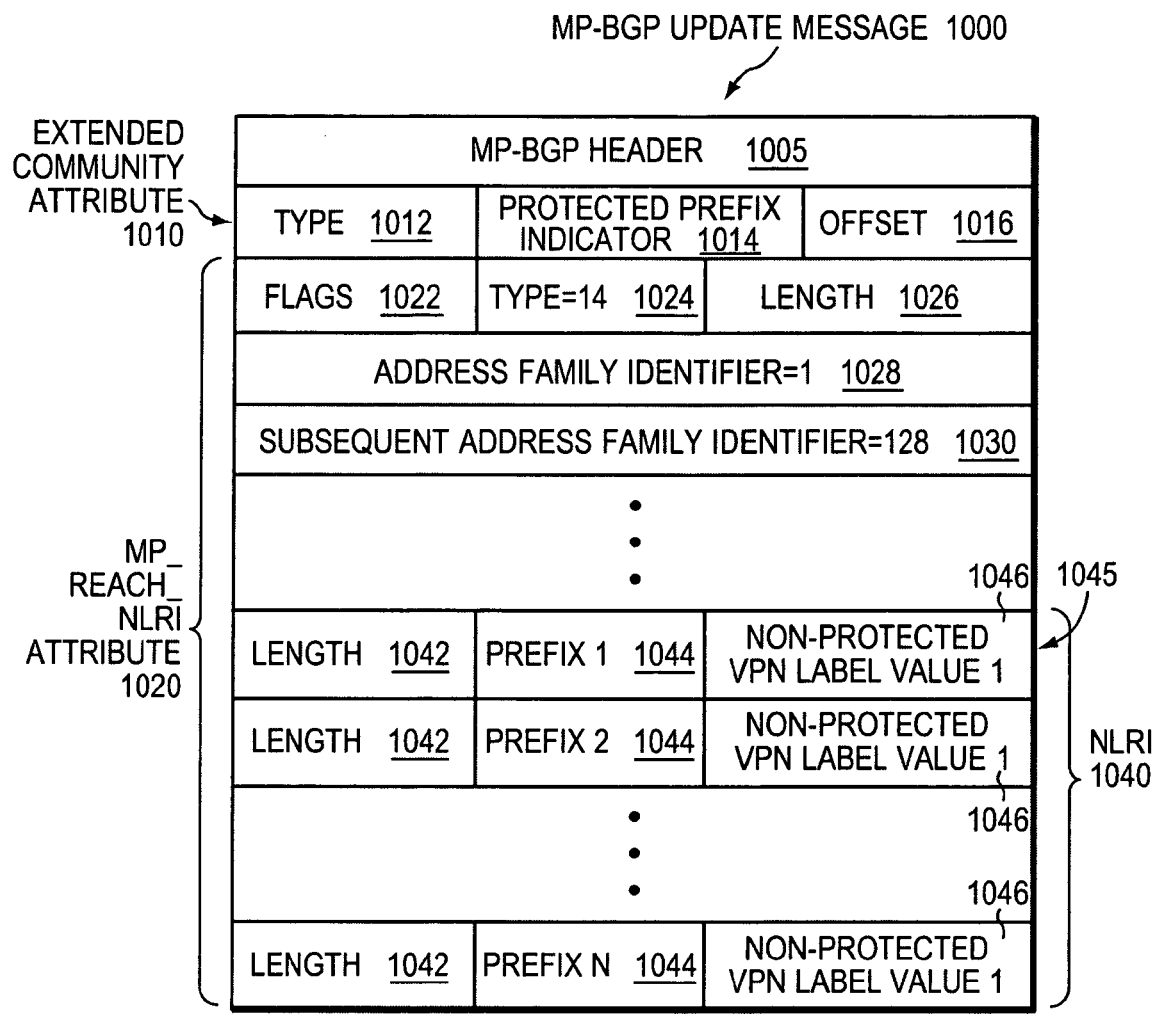
FIG. 10 is a schematic block diagram of an exemplary MP-BGP Update message that may be used to disseminate protected and non-protected VPN label values in accordance with a third illustrative embodiment.

FIG. 10 illustrates a MP-BGP Update message 1000 that a PE device may use to advertise a set of address prefixes that are reachable to the PE device via a neighboring CE device. Each advertised prefix value is associated with the non-protected VPN label value that the PE device allocates for the CE device. The MP-BGP Update message includes a flagging mechanism to indicate that the advertised prefixes are FRR protected using the L+x method of VPN label allocation. The message 1000 includes, among other things, a MP-BGP header 1005, a BGP extended community attribute 1010 and a MP_Reach_NLRI attribute 1020. The MP-BGP header 1005 stores conventional BGP header information, such as a BGP marker, a total message length, a type code identifying the message 1000 as a BGP Update, etc. Other BGP header information that may be stored in the header 1005 is described in more detail in the RFC 1771, entitled *A Border Gateway Protocol 4* (BGP-4), which is hereby incorporated by reference in its entirety.

The MP_Reach_NLRI attribute 1020 stores, inter alia, a flags field 1022, a type field 1024, a length field 1026, an AFI field 1028, a SAFI field 1030 and a set of NLRI 1040 containing one or more NLRI entries 1045. The contents of the fields 1022-1046 are substantially the same as the contents of the fields 622-646 described above with regards to the MP-BGP Update message 600. However, unlike the message 600, each address prefix 1044 advertised in the NLRI 1040 is associated with the same non-protected VPN label value, i.e., the non-protected VPN label value allocated for the CE device through which the advertised prefixes are reachable.

The BGP extended community attribute 1010 is used to flag the set of address prefixes 1044 as being FRR protected using the L+x method of VPN label allocation. To that end, the attribute 1010 includes, inter alia, a type field 1012, a protected prefix indicator field 1014 and an offset field 1016. The type field 1012 stores a value indicating that the attribute 1010 is being used to flag a set of prefixes as being FRR protected. The protected prefix indicator field 1014 stores a value indicating that the advertised prefixes 1044 are protected using the L+x method of VPN label allocation. The offset field 1016 stores a predetermined offset value that is used to derive a protected VPN label value given a non-protected VPN label value. Various types of extended community attributes 1010 may be employed in this illustrative embodiment, including but not limited to BGP attributes described in the IETF Internet Draft draft-ietf-idr-bgp-ext-communities-07.txt, entitled *BGP Extended Communities Attribute*, by S. Sangli et al., which is hereby incorporated by reference as though fully set forth herein.

Illustratively, if the offset field 1016 stores a value equal to x, then the protected VPN label value for the set of prefixes 1044 may be derived by adding the offset to the advertised non-protected VPN label value 1046. Of course, alternative embodiments may use the offset value differently, depending on the mathematical function used to derive a protected VPN label value from a non-protected VPN label value. It is expressly contemplated that various mathematical functions may be employed to derive the FRR-protected VPN label value using one or more predetermined offset values and that such mathematical functions are not limited to only additive operations.

Figure 11:
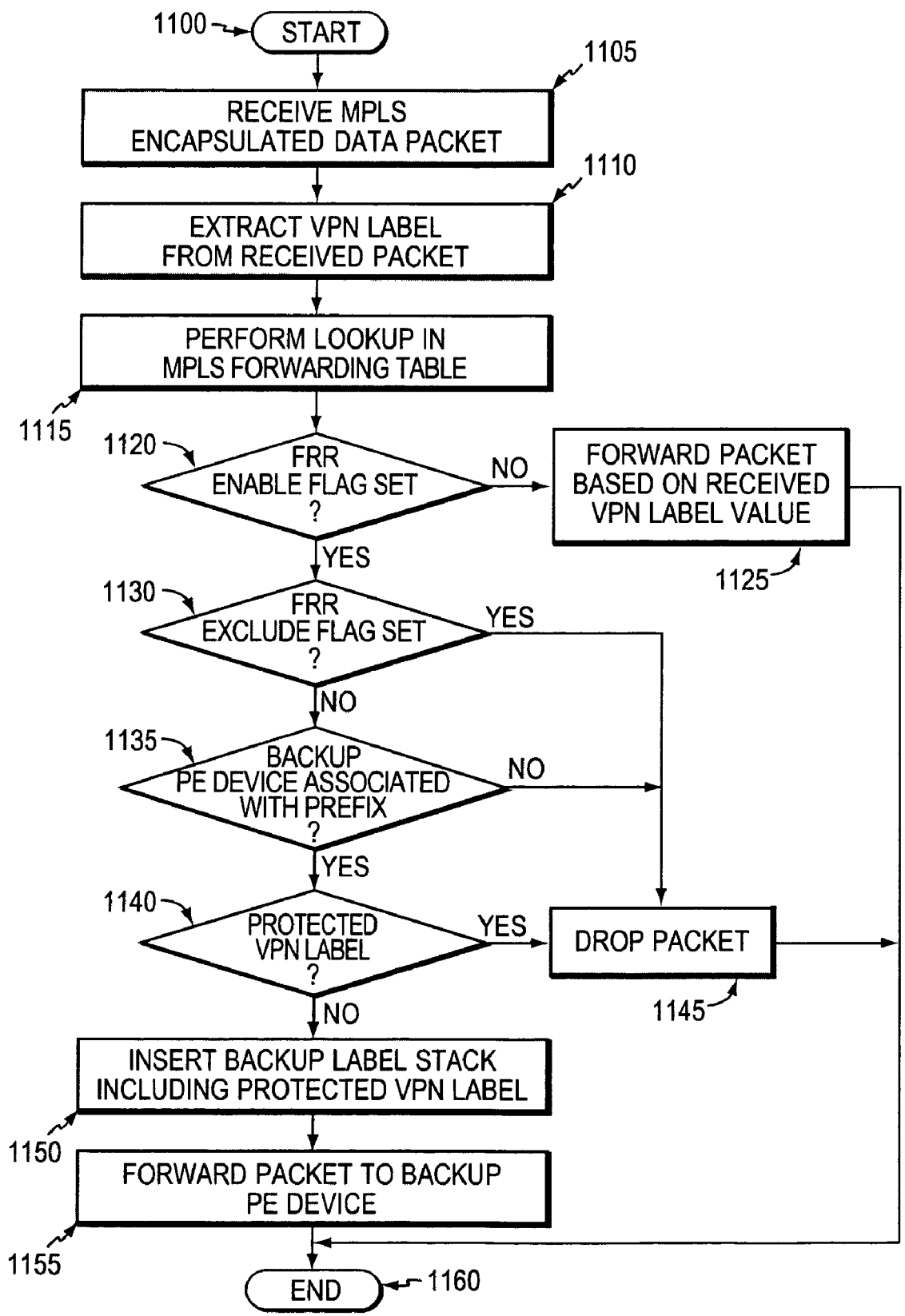
FIG. 11 is a flowchart illustrating a sequence of steps for performing FRR operations at the edge of a network in accordance with the illustrative embodiments of the invention.

FIG. 11 illustrates a flowchart containing a sequence of steps for performing the FRR technique of the present invention. The sequence begins at step 1100 and proceeds to step 1105 where a MPLS encapsulated data packet 300 is received at a PE device 400. The operating system 460 of the PE device extracts a VPN label value 320 from the received packet, at step 1110, and uses the extracted VPN label value to perform a lookup operation in its label forwarding table 500, at step 1115. Specifically, a label forwarding table entry 510 is located having an address prefix 520 matching the packet's destination IP address and a VPN label value 530 equal to the packet's extracted VPN label value.

At step 1120, the FRR enable flag 550 in the located table entry 510 is analyzed to determine whether FRR operations are currently being performed for packets containing the received VPN label value. If FRR operations are not currently underway, the received packet is processed based on the packet's matching table entry 510 in the label forwarding table 500. The received data packet is then forwarded to its next-hop destination at step 1125. The sequence ends at step 1160.

If, at step 1120, the value of the FRR enable flag indicates that FRR operations should be performed, then at step 1130 the FRR exclude flag 560 is analyzed to determine whether the packet is permitted to be FRR rerouted. If the packet is not allowed to be rerouted, the packet is dropped at step 1145 and the sequence ends at step 1160. When the FRR exclude flag value indicates that FRR operations may be performed for the received packet, the sequence advances to step 1135 where it is determined whether there is a backup PE device 570 identified in the received packet's matching label forwarding table entry 510. If no such backup PE device exists, then at step 1145 the packet is dropped and the sequence ends at step 1160.

At step 1140, the routing operating system 460 determines whether the packet's VPN label 320 contains a protected VPN label value, thereby indicating that the packet has been previously FRR protected. For instance, the VPN label value may be identified as a protected VPN label value based on, e.g., the value of the VPN label value's least significant bit or based on a flag value stored in the packet's matching label forwarding table entry 510. If at step 1140 the received packet is determined to already have been FRR protected, the packet is dropped at step 1145 and the sequence ends at step 1160. On the other hand, if the packet was not previously protected, the sequence advances to step 1150 and an appropriate backup label stack 580, including an IGP label value and a protected VPN label value associated with the backup PE device 570, is inserted in the received packet. The FRR protected packet is then forwarded to the backup PE device, at step 1155, preferably via a MPLS or IP tunnel. The sequence ends at step 1160.

Advantageously, the inventive technique provides a fast and efficient way for a backup edge device to identify protected data packets that have been previously rerouted in response to, e.g., a CE node or PE-CE link failure. The technique is not limited to MPLS/VPN network architectures and may be deployed at the edge of networks implementing various topologies and protocols. Further, the invention is not limited to any particular hardware platform or set of software capabilities.

The foregoing has been a detailed description of illustrative embodiments of the invention. Various modifications and additions can be made without departing from the spirit and scope of the invention. For example, while the inventive FRR technique has been illustratively described with respect to MPLS/VPN networks, it is also expressly contemplated that the invention may be deployed at the edge of other types of networks and subnetworks, such as autonomous systems, broadcast domains, routing areas, etc., that implement various network communication protocols. Although the illustrative embodiments described herein assume a one-to-one correspondence between customer sites and VPNs, those skilled in the art will understand that the FRR technique also may be deployed in networks in which customer sites are permitted to participate in more than one VPN.

Furthermore, the illustrative embodiments may be modified to utilize IP Version 6 (IPv6) technology. The IPv6 protocol has been introduced to increase the number of available network addresses and provide additional services at the internetwork layer of the conventional TCP/IP protocol stack. The IPv6 protocol employs a larger address space than its IPv4 predecessor, and utilizes 128 bit (sixteen byte) values to address network nodes rather than the 32 bit addresses employed by IPv4. Those skilled in the art will appreciate that the illustrative embodiments described herein are equally applicable to other address formats, including IPv6 addresses.

It is expressly contemplated that the teachings of this invention can be implemented as software, including a computer-readable medium having program instructions executing on a computer, hardware, firmware, or a combination thereof. For instance, the invention may be implemented by a PE device 400 having one or more processors, some of which may reside on the network interfaces 410 or on line cards containing the network interfaces. Further, the memory 440 may be distributed among a plurality of different memory elements, both local and remote to the PE device 400. In general, the inventive technique therefore may be implemented in various combinations of hardware and/or software. Accordingly, this description is meant to be taken only by way of example and not to otherwise limit the scope of the invention.

What is claimed is:

1. A method for performing fast reroute (FRR) operations at the edge of a computer network, the network having first and second edge devices coupled to a neighboring routing domain, the method comprising:
   detecting a loss of communication between the first edge device and the neighboring routing domain;
   receiving a data packet at the first edge device, the received data packet containing a destination address that is reachable via the neighboring routing domain;
   determining whether a virtual private network (VPN) label value stored in a label stack of the received data packet is a protected VPN label value, the protected VPN label value indicating that the received packet was previously rerouted in accordance with FRR operations; and
   rerouting, in response to determining that the VPN label value stored in the received data packet is not a protected VPN label value, the received data packet to the second edge device for forwarding to the neighboring routing domain.

2. The method of claim 1, wherein the step of determining whether the VPN label value stored in the received data packet is a protected VPN label value further comprises:
   locating a predetermined bit of the VPN label value stored in the received data packet; and
   determining whether the value of the predetermined bit indicates that the VPN label value is a protected VPN label value.

3. The method of claim 2, wherein the predetermined bit is a least-significant bit of the VPN label value stored in the received data packet.

4. The method of claim 1, wherein the step of determining whether the VPN label value stored in the received data packet is a protected VPN label value further comprises:

locating a label forwarding table entry storing a VPN label value equal to the VPN label value stored in the received data packet; and determining whether the VPN label value stored in the received data packet is a protected VPN label value based on the contents of the label forwarding table entry.

5. The method of claim 1, further comprising:

receiving an advertisement containing a set of address prefixes and an indication that the address prefixes are FRR protected, each address prefix in the advertisement being associated with a respective pair of non-protected and protected VPN label values.

6. The method of claim 5, wherein the indication is a Border Gateway Protocol (BGP) extended community attribute included in the advertisement.

7. The method of claim 5, wherein each address prefix is associated with a sequential pair of non-protected and protected VPN label values.

8. The method of claim 7, wherein each address prefix is associated with the same sequential pair of non-protected and protected VPN label values, the sequential pair of non-protected and protected VPN label values being associated with an edge device in the neighboring routing domain.

9. The method of claim 5, further comprising:

advertising the address prefixes' non-protected VPN label values in the advertisement; and deriving the address prefixes' protected VPN label values by based on their advertised non-protected VPN label values.

10. The method of claim 5, wherein at least some address prefixes are associated with a non-sequential pair of non-protected and protected VPN label values.

11. The method of claim 10, further comprising:

advertising the address prefixes' non-protected VPN label values in the advertisement; and deriving the address prefixes' protected VPN label values based on their advertised non-protected VPN label values.

12. The method of claim 11, wherein the step of deriving the address prefixes' protected VPN label values further comprises:

adding a predetermined offset value to the address prefixes' non-protected VPN label values.

13. The method of claim 12, wherein the predetermined offset value is stored in the advertisement.

14. A network node configured to perform fast reroute (FRR) operations at the edge of a computer network, the network node comprising:

a processor;

a first network interface adapted to communicate with a neighboring routing domain;

a second network interface adapted to receive a data packet containing a destination address that is reachable via the neighboring routing domain; and a memory adapted to store instructions which are executable by the processor for performing the steps:

detecting a loss of communication over the first network interface;

determining whether a virtual private network (VPN) label value stored in a label stack of the data packet received at the second network interface is a protected VPN label value, the protected VPN label value indicating that the received packet was previously rerouted in accordance with FRR operations; and rerouting, in response to determining that the VPN label value stored in the received data packet is not a protected VPN label value, the received data packet to a second edge device for forwarding to the neighboring routing domain.

15. The network node of claim 14, wherein the memory is further adapted to store instructions for:

locating a predetermined bit of the VPN label value stored in the received data packet; and determining whether the value of the predetermined bit indicates that the VPN label value is a protected VPN label value.

16. The network node of claim 14, wherein the memory is further adapted to store instructions for:

receiving an advertisement containing a set of address prefixes and an indication that the address prefixes are FRR protected, each address prefix in the advertisement being associated with a respective pair of non-protected and protected VPN label values.

17. The network node of claim 16, further comprising:

advertising the address prefixes' non-protected VPN label values in the advertisement; and deriving the address prefixes' protected VPN label values based on their advertised non-protected VPN label values.

18. A network node configured to perform fast reroute (FRR) operations at the edge of a computer network, the network node comprising:

a first network interface adapted to communicate with a neighboring routing domain;

means for detecting a loss of communication over the first network interface;

a second network interface adapted to receive a data packet containing a destination address that is reachable via the neighboring routing domain;

means for determining whether a virtual private network (VPN) label value stored in a label stack of the received data packet is a protected VPN label value, the protected VPN label value indicating that the received packet was previously rerouted in accordance with FRR operations; and means for rerouting, in response to determining that the VPN label value stored in the received data packet is not a protected VPN label value, the received data packet to a second edge device for forwarding to the neighboring routing domain.

19. The network node of claim 18, further comprising:

means for locating a predetermined bit of the VPN label value stored in the received data packet; and means for determining whether the value of the predetermined bit indicates that the VPN label value is a protected VPN label value.

20. The network node of claim 18, further comprising:

means for receiving an advertisement containing a set of address prefixes and an indication that the address prefixes are FRR protected, each address prefix in the advertisement being associated with a respective pair of non-protected and protected VPN label values.

21. The network node of claim 20, further comprising:

means for advertising the address prefixes' non-protected VPN label values in the advertisement; and means for deriving the address prefixes' protected VPN label values based on their advertised non-protected VPN label values.

22. A computer network, comprising:

a first edge device coupled to a neighboring routing domain; and a second edge device coupled to the neighboring routing domain, the second edge device being configured to:

detect a loss of communication with the neighboring routing domain;

receive a data packet containing a destination address that is reachable via the neighboring routing domain;

determine whether a virtual private network (VPN) label value stored in the received data packet is a protected VPN label value, the protected VPN label value indicating that the received packet was previously rerouted in accordance with FRR operations; and reroute, in response to determining that the VPN label value stored in the received data packet is not a protected VPN label value, the received data packet to the first edge device for forwarding to the neighboring routing domain.

23. A computer-readable medium storing instructions for execution on a processor for the practice of a method of performing fast reroute (FRR) operations at the edge of a computer network, the network having first and second edge devices coupled to a neighboring routing domain, the method comprising:

detecting a loss of communication between the first edge device and the neighboring routing domain;

receiving a data packet at the first edge device, the received data packet containing a destination address that is reachable via the neighboring routing domain;

determining whether a virtual private network (VPN) label value stored in a label stack of the received data packet is a protected VPN label value, the protected VPN label value indicating that the received packet was previously rerouted in accordance with FRR operations; and rerouting, in response to determining that the VPN label value stored in the received data packet is not a protected VPN label value, the received data packet to the second edge device for forwarding to the neighboring routing domain.

* * * * *

UNITED STATES PATENT AND TRADEMARK OFFICE
CERTIFICATE OF CORRECTION

PATENT NO. : 7,633,859 B2 Page 1 of 1
APPLICATION NO. : 11/046163
DATED : December 15, 2009
INVENTOR(S) : Filsfils et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,633,859 B2 | |
| APPLICATION NO. | : 11/046163 | |
| DATED | : December 15, 2009 | |
| INVENTOR(S) | : Clarence Filsfils et al. | |

It is certified that error appears in the above-identified patent and that said Letters Patent is hereby corrected as shown below:

Col. 19, Line 28, please amend as shown:

[[by ]]based on their advertised non-protected VPN lable

Col. 21, Line 6, please amend as shown:

value stored in <u>a lable stack of</u> the received data packet is a protected

Signed and Sealed this
Eighth Day of March, 2011

David J. Kappos
*Director of the United States Patent and Trademark Office*